(12) United States Patent
Laier

(10) Patent No.: US 11,061,816 B2
(45) Date of Patent: Jul. 13, 2021

(54) COMPUTER MEMORY MAPPING AND INVALIDATION

(71) Applicant: EMC IP Holding Company LLC, Hopkinton, MA (US)

(72) Inventor: Max Laier, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 360 days.

(21) Appl. No.: 16/254,010

(22) Filed: Jan. 22, 2019

(65) Prior Publication Data
US 2020/0233798 A1    Jul. 23, 2020

(51) Int. Cl.
*G06F 12/06* (2006.01)

(52) U.S. Cl.
CPC .. *G06F 12/0646* (2013.01); *G06F 2212/1008* (2013.01); *G06F 2212/657* (2013.01)

(58) Field of Classification Search
None
See application file for complete search history.

(56) References Cited

U.S. PATENT DOCUMENTS

| 2009/0228537 A1* | 9/2009 | Branda | G06F 12/0261 |
| 2013/0007370 A1* | 1/2013 | Parikh | G06F 12/0842 |
| | | | 711/129 |

* cited by examiner

Primary Examiner — Ryan Bertram
Assistant Examiner — Edmund H Kwong
(74) Attorney, Agent, or Firm — Amin, Turocy & Watson, LLP

(57) ABSTRACT

Techniques are provided for computer memory mapping and allocation. In an example, a virtual memory address space is divided into an active half and a passive half. Processors make memory allocations to their respective portions of the active half until one processor has made a determined number of allocations. When that occurs, and when all memory in the passive half that has been allocated has been returned, then the active and passive halves are switched, and all processors are switched to making allocations in the newly-active half.

20 Claims, 12 Drawing Sheets

200

COMPUTER MEMORY MAPPING AND INVALIDATION

TECHNICAL FIELD

The present application relates generally to techniques for computer memory mapping, and more specifically, to providing efficient memory mapping and invalidation for short-lived and fixed-sized, memory allocations.

BACKGROUND

A memory map generally identifies a translation between a logical (or virtual) address space and a physical address space. A memory map can be implemented to provide a thread with a private, contiguous logical address space. A thread can then utilize its private logical address space without needing to account for memory used by another thread.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
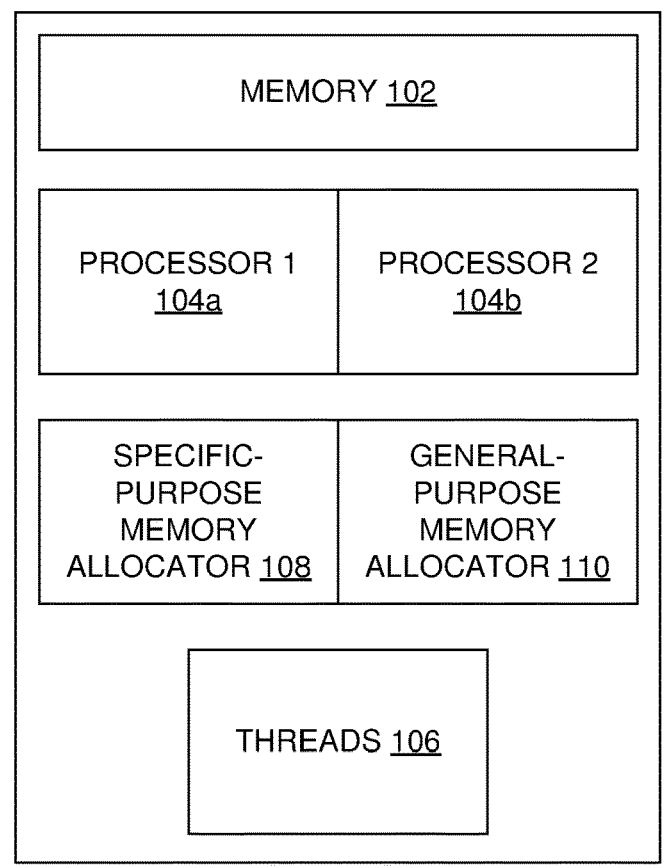
FIG. 1 illustrates a block diagram of an example computer system that can facilitate computer memory mapping and invalidation, in accordance with certain embodiments of this disclosure.

General-purpose memory allocators (or general-purpose memory mappers) can be inefficient and expensive (in terms of computing resources) because they need to provide various sizes of memory allocations that are allocated for varying durations of time. General-purpose memory allocators can run into segmentation problems, problems with compacting, and problems with finding places for memory allocations. Additionally, general-purpose memory allocators can encounter contention problems when they need to remove mappings as memory is returned to a general-purpose memory allocator. With general-purpose memory allocators, invalidation of a processor mappings can be an expensive operation because it can require a synchronization primitive across all processor cores in a multi-processor core system. In sum, a problem with general-purpose memory allocators is that general-purpose memory allocators cause a huge overhead for a computing system.

In some scenarios, using a general-purpose memory allocator for high-throughput use cases can be insufficient. An example of such a high-throughput use case for which a general-purpose memory allocator can be found lacking is for small, fixed size memory allocations that have short lifetimes. In such a use case, a temporary allocation is made, then torn down, and many such allocations and teardowns are made with a high throughput. General-purpose memory allocators are not configured to perform this task well, and the result of using a general-purpose memory allocator in this scenario is performance bottlenecks in a computer system.

A way to address these problems with general-purpose memory allocators is to use a specific-purpose memory allocator for some use cases. An example of a use case where a specific-purpose memory allocator can show improvement relative to a general-purpose memory allocator is in data compression and/or data decompression. In such a use case, there is data comprised from multiple storage locations—for example the data can be stored in five blocks in five different physical memory locations. And in this use case, there could be no single virtual address mapping that represents this data. So, to access this data involves accessing individual, non-continuous blocks.

However, some compression processes expect input data to be stored in a continuous mapping. Providing a continuous mapping to a process like such a compression problem can be a goal, in some examples. Then, with a general-purpose memory allocator, the general-purpose memory allocator could need to map a block big enough for the data, allocate into it based on a call from a process, then tear down the mapping, return the allocation to be allocated again, and continue on. The above problems with a general-purpose memory allocator can make it costly to use to perform this specific task.

The above deals with providing an input to a compression process. Similar considerations are made for dealing with the output of the compression process. Such a compression process can require an output buffer comprised of individual pages that are mapped into the output buffer. This can lead to similar downsides with using a general-purpose memory allocator regarding an output buffer.

In some examples, a specific-purpose memory allocator as described herein can operate in conjunction with a general-purpose memory allocator (and/or other memory allocators) in a computer system. Of a virtual address space, various portions of this virtual address space can be reserved for a particular memory allocator to use. For example, in the case of using a specific-purpose memory allocator and a general-purpose memory allocator, a first portion of a virtual address space can be reserved for the specific-purpose memory allocator, and a second portion of the virtual address space (or the remainder of the virtual address space after reserving the first portion) can be reserved for the general-purpose memory allocator.

Example Architectures

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of an example computer system 100 that can facilitate computer memory mapping and invalidation, in accordance with certain embodiments of this disclosure. Computer system 100 comprises memory 102 processor 104a, processor 104b, threads 106, specific-purpose memory allocator 108, and general-purpose memory allocator 110. Memory 102 can comprise computer memory, and can also comprise a virtual address space that maps a set of virtual memory addresses to a corresponding set of physical memory addresses in memory 102.

Processor 104a and processor 104b can each comprise a computer processor. While processor 104a and processor 104b are depicted as separate processors, it can be appreciated that they can be cores of one processor. Additionally, it can be appreciated that FIG. 1 (and the other FIGs.) present simplified drawings to emphasize particular aspects, and that there can be, for instance, examples that utilize a different number of processors and/or a different number of processor cores.

Threads 106 are process threads that can execute on processor 104a and/or processor 104b. In the course of executing, threads 106 can make requests for memory allocations, which can be handled by specific-purpose memory allocator 108 and/or general-purpose memory allocator 110, and these memory allocations can be made for memory 102.

Computer system 100 can provide an application programming interface (API) that threads can invoke to make memory allocations with specific-purpose memory allocator 108 (and/or general-purpose memory allocator 110).

In an example system with a 4 kilobyte (KB) page size, example fixed sizes to be allocated by specific-purpose memory allocator 108 can range from 8 KB to 2 megabytes (MB). In this example system, example lifetimes for these allocations could range up to 100s of milliseconds (ms). In some examples, where there is frequent usage of memory allocations (e.g., because of many users on a computer system), a special-purpose memory allocator as described herein can be used where a lifetime for an allocation is relatively short. In contrast, where there are fewer users, or there is otherwise less-frequent usage, a special-purpose memory allocator as described herein can be used where a lifetime for an allocation is longer.

In some examples, an allocation request can be received at a specific processor. That processor can determine which half of the virtual address space is active (such as one of the two halves of memory address space 200 of FIG. 2; this can be a global setting for a specific-purpose memory allocator's virtual address space). If there is free space in that processor's portion of the active half, the processor can allocate the allocation request in the next spot in the processor's bucket. For example, in a case where the processor's bucket has a size of 128 MB, and the fixed-sized allocations are 128 KB, then there can be 1,024 of these fixed-sized allocations in a bucket. For each bucket, two counters can be maintained—one for allocations, and one for deallocations (sometimes called "frees") (e.g., allocation counter 308a and return counter 310a of FIG. 3).

If the allocation counter stores a number smaller than the number of allocations for the bucket (e.g., 1,024 allocations in the scenario with a 128 MB bucket, and a 128 KB allocation size), then that indicates that there is space in the bucket. The allocation is made, and the processor can provide the calling thread with an address space map.

The counter operation to this allocation request can be a deallocation request that is received. In response to a deallocation request, the proper processor bucket can be determined (e.g., the deallocation request can correspond to either half of the virtual address space), and the deallocation counter for that bucket can be incremented by one. In some examples, no umapping is performed at this point where the deallocation counter is incremented.

However, if the allocation counter stores a number equal to the number of the allocations for the bucket, (e.g., 1,024 allocations have been made using the above example), then it can be determined that this bucket is full (even though some deallocations to this bucket can have been made). Then, the system can switch halves of the virtual memory address for all processors. In switching halves, the currently active half becomes the passive half, and the currently passive half becomes the active half.

To effectuate this switch, a processor can be in charge of the switch, and that processor can iterate through the buckets in the currently-passive half to determine whether all allocations taken out of that half have been returned. That is, the processor can determine whether the allocation counter for that bucket and the deallocation counter for that bucket have equal values. In some examples, since the passive half has been passive for a while, it will usually be true that all allocations taken out of the passive half have since been returned.

If all allocations taken out of the passive half have since been returned, then the passive half can be batch invalidated in a single operation, before being switched to being active. This can generally occur in a short-lived, temporary allocation scenario, since the allocations are short-lived. In contrast, in a longer-lived allocation scenario, it can be less likely that all allocations taken out of the passive half have since been returned.

That is, while allocations are made to an active half, outstanding requests in the passive half can be returned as their callers finish their work. When a bucket in the active half is fully allocated, then a switch can be made again (along with a check that all allocations in the passive half have since been returned).

In some examples where a computer system utilizes multiple processors, the multiple processors can utilize the same half at the same time. By using the same half at the same time, it can increase the likelihood that all memory allocations in the passive half are returned before that passive half is switched to the active half.

Where all allocations in the half have been returned, a bulk invalidation operation can be used to invalidate those memory addresses, which can conserve computing resources relative to a more piecemeal invalidation of memory addresses. For example, a general-purpose memory allocator can manage subsections of a virtual address space, and subsections of those subsections, etc. In the course of this management, such a general-purpose memory allocator can keep track of which buckets are full, which buckets are empty, where to return returned allocations, etc. An approach where multiple processors can all use the same half at a given time can lead to a simplified approach. That is, in an example, as soon as a processor runs out of allocations in its bucket for a half, all processors can be switched over to the other half. This approach can reduce or minimize a complexity of implementation, contention, and locking and coordination involved.

In some examples, when a half is switched from active to passive, the now-passive half's allocation and deallocation counters can still be maintained. In these examples, while no new allocations are taken out of the passive half, returning allocations are still accounted for by increasing a value of the deallocation counter for the bucket where they are returned to.

In some examples, not all allocations in the passive half will be returned when an attempt is made to switch that passive half to be the active half. Where this happens, memory allocation can fall back to utilizing a general-purpose memory allocator for allocations. Then, checks can continue to be periodically made to see if all allocations to the passive half have been returned. Where this check indicates that all allocations to the passive half have been returned, memory allocations can move back to the specific-purpose memory allocator from the general-purpose memory allocator, and the passive half can be switched to the active half (along with bulk invalidating that half).

In some examples, the location of individual allocations within a half or within a bucket are not monitored. That is, when an allocation is returned, rather than tracking the specific address of that returned allocation, a count of returned allocations can be increased. So, the total number of returned allocations can be maintained, though which specific returned allocations these are is not maintained.

Then, when a check is made to see whether a number of allocations and a number of returned allocations for a particular bucket are equal, and it turns out that the number of returned allocations is less than the number of allocations, it can be determined that there is some allocation or allocations that is outstanding. However, since the individual allocations are not monitored in this example, which exact allocations are outstanding can be unknown or undetermined.

In some examples, tracking which exact allocations are outstanding can be more expensive in computing resources than maintaining two counters. In some implementations, tracking which exact allocations are outstanding can involve maintaining a corresponding bitmap or tree-like data structure, which can be expensive to update, and also have contention issues. In contrast, in some examples, an approach that utilizes counters that are incremented or otherwise increased can be updated through atomic processor operations, so can mitigate against contention issues.

Specific-purpose memory allocator 108 and general-purpose memory allocator 110 can implement aspects of specific-purpose memory allocators and general-purpose memory allocators, respectively, as described herein. For example, specific-purpose memory allocator 108 and general-purpose memory allocator 110 can implement aspects of the operating procedures of FIGS. 7-10.

Figure 2:
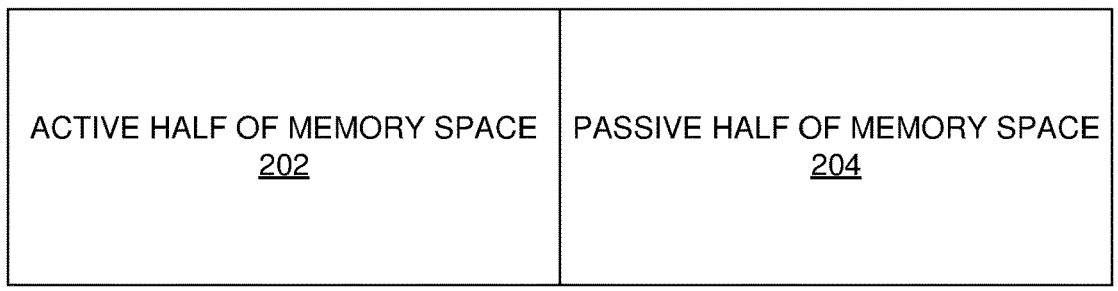
FIG. 2 illustrates a block diagram of a memory address space divided into two halves, in accordance with certain embodiments of this disclosure.

FIG. 2 illustrates a block diagram of a memory address space 200 divided into two halves, in accordance with certain embodiments of this disclosure. In some examples, memory address space 200 can be a contiguous virtual address space that corresponds to memory 102 of FIG. 1. Memory address space 200 comprises two halves—active half 202 and passive half 204. Active half 202 and passive half 204 can be equal in size (e.g., they can both have a size of 64 MB). Active half 202 is a portion of the address space to which new memory allocations are made. Then, passive half 204 is a portion of the address space where memory allocations are not currently made.

In some examples, when the active and passive halves have not yet been switched, it can be that there have not been memory allocations made to passive half 204 yet. In other examples, passive half 202 has previously been the active half, to which memory allocations have been made, and in its role as a passive half, memory can be returned by a thread that requested it, and these memory returns can be counted (such as in a returned allocation counter).

Figure 3:
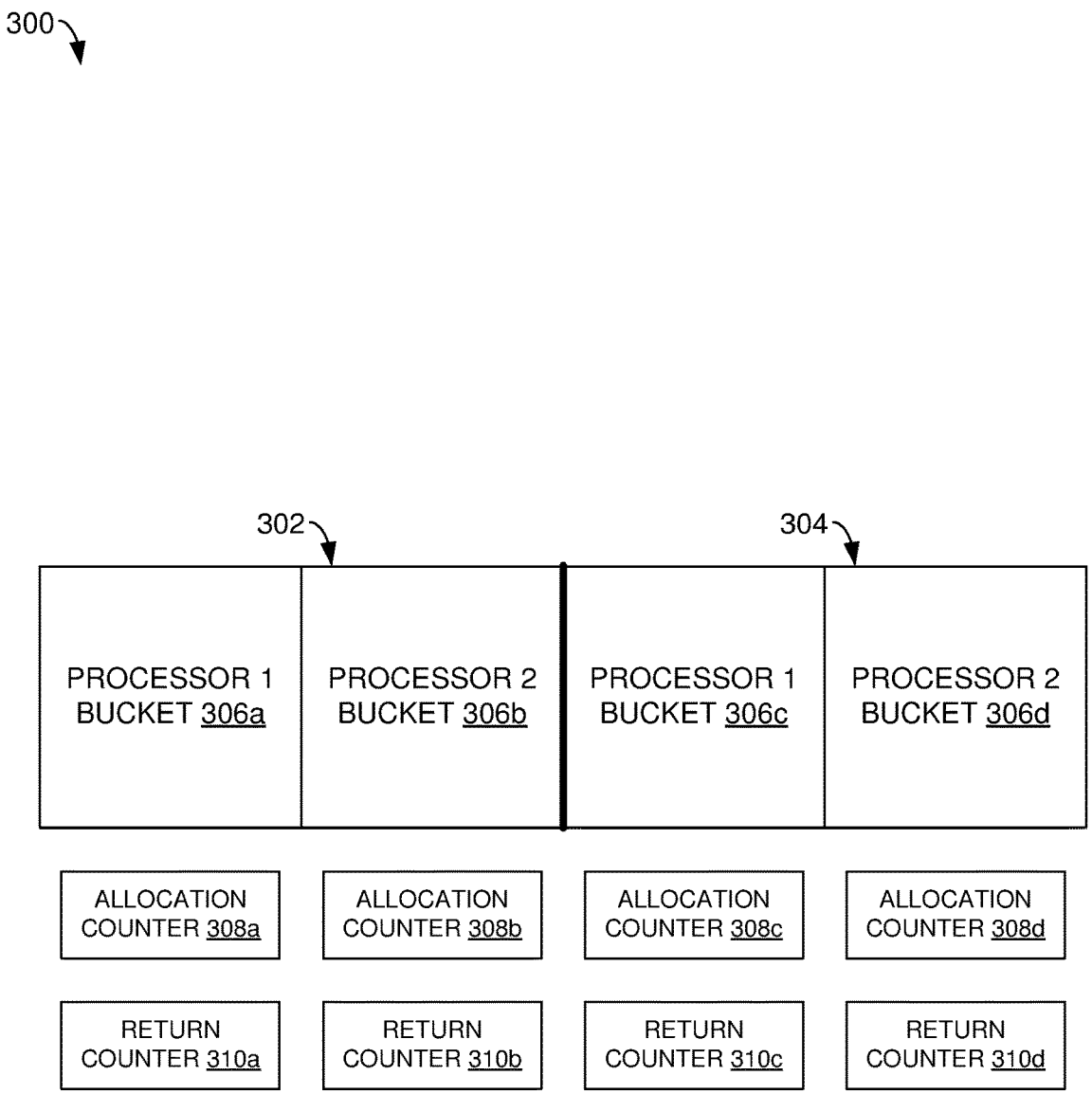
FIG. 3 illustrates a block diagram of the memory address space of FIG. 2 further divided into per-processor buckets, in accordance with certain embodiments of this disclosure

When an allocation has been made for each available memory space in active half 204 (or a bucket of the active half, as described with respect to FIG. 3), then the active and passive halves can be switched. That is, active half 202 can become the passive half, and passive half 204 can become the active half.

FIG. 3 illustrates a block diagram of the memory address space of FIG. 2 further divided into per-processor buckets, in accordance with certain embodiments of this disclosure. A bucket can comprise a portion of a memory address space that is private to a particular processor. Depicted is memory address space 300, which comprises two halves—half 302 and half 304. Each half is further divided into two buckets to correspond to two processors—half 302 comprises processor 1 bucket 306a and processor 2 bucket 306b, and half 304 comprises processor 1 bucket 306c and processor 1 bucket 306d.

A particular processor can utilize processor 1 bucket 306a for new memory allocations when half 302 is active, and utilize processor 1 bucket 306c for new memory allocations when half 304 is active. Similarly, another processor can utilize processor 1 bucket 306a for new memory allocations when half 302 is active, and utilize processor 1 bucket 306c for new memory allocations when half 304 is active.

As depicted, each of bucket 306a, bucket 306b, bucket 306c, and bucket 306d has two corresponding counters—an allocation counter and a return counter. That is bucket 306a has allocation counter 308a and return counter 310a; bucket 306b has allocation counter 308b and return counter 310b; bucket 306c has allocation counter 308c and return counter 310c; and bucket 306d has allocation counter 308d and return counter 308d. An allocation and a return counter can each store a value (e.g., each of an allocation and a return counter can comprise a memory address in which an integer is stored).

As memory allocations are made to a particular bucket, its corresponding allocation counter can be incremented accordingly. For instance, where one new memory allocation is made to processor 1 bucket 306a, then a value stored by allocation counter 308a can be increased by one. Similarly, as memory allocations are returned to a particular bucket, its corresponding return counter can be incremented accordingly. For instance, where a memory allocation is returned to bucket 306a, then a value stored by return counter 310a can be increased by one.

Figure 4:
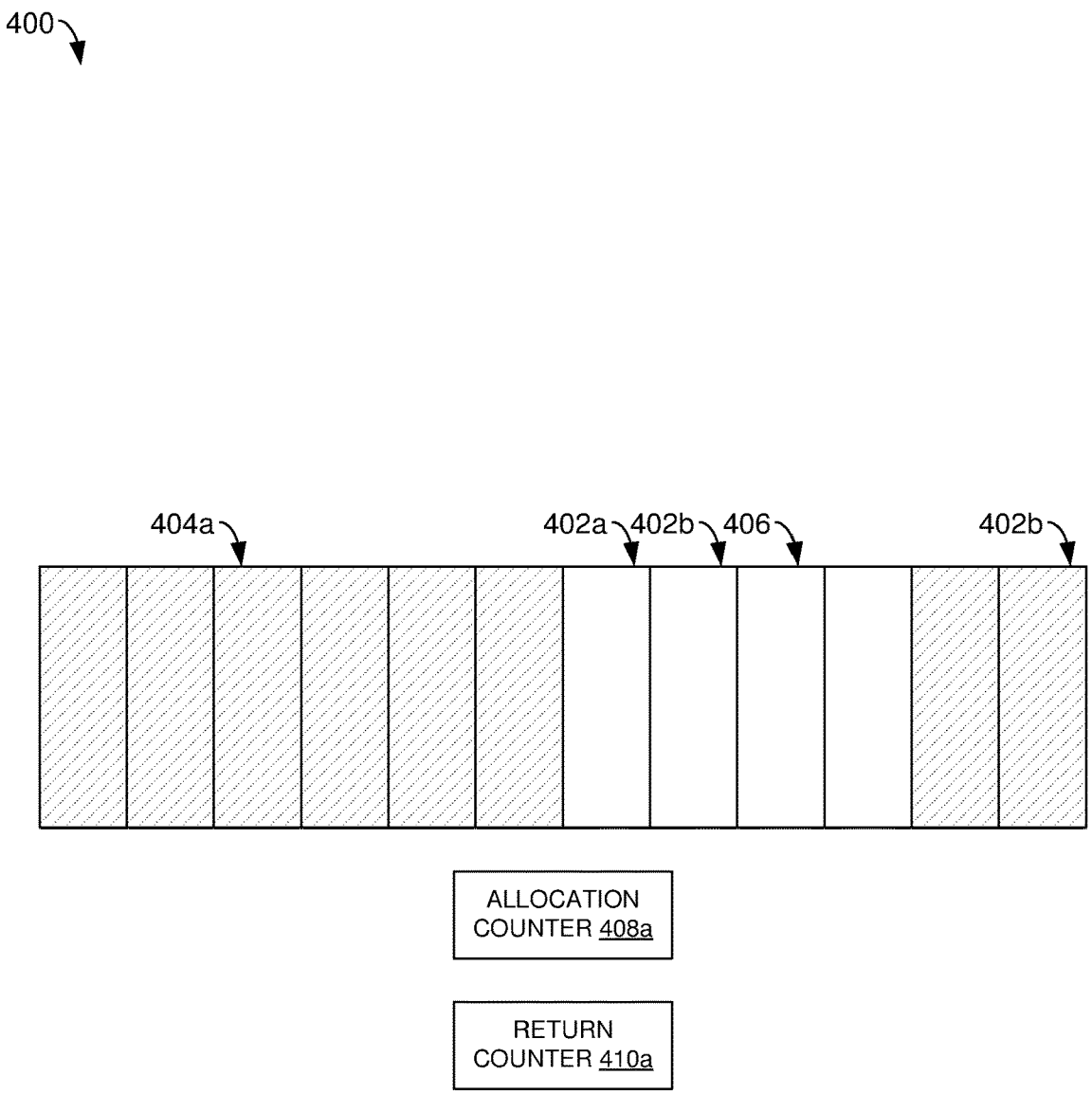
FIG. 4 illustrates a per-processor bucket that is fully allocated, in accordance with certain embodiments of this disclosure.

FIG. 4 illustrates a per-processor bucket 400 that is fully allocated, in accordance with certain embodiments of this disclosure. In some examples, processor bucket 400 can be processor 1 bucket 306a or processor 2 bucket 306b of FIG. 3. Per-processor bucket can comprise allocation slot 402a, allocation slot 402b, allocated slots 404a, allocated slots 404d, returned slots 406, allocation counter 408, and return counter 410.

Allocation slot 402a and allocation slot 402b can each comprise fixed-sized portions of processor bucket 400 that can be allocated in response to allocation requests. In some examples, allocations to processor bucket 400 can be of a fixed size, and there can be some set number of slots for allocations within a bucket. Using an example of a 128 MB bucket, and fixed-sized allocations of 128 KB, then there can be 1,024 of these fixed-sized allocations in a bucket.

Allocated slots 404a and allocated slots 404c can each be a plurality of slots of processor bucket 400 that have been allocated, where the allocation has not yet been returned by the calling thread. Returned slots 406 can be a plurality of slots of processor bucket 400 that were once allocated, and have since been returned by the calling thread.

Allocation counter 408 and return counter 410 can be similar to allocation counter 308a and return counter 410a of FIG. 3, respectively. Continuing with the example where there are 1,024 fixed-sized allocations (each of which can be referred to as a slot) in processor bucket 400, when the value in allocation counter 408 reaches 1,024, processor bucket 408 can be determined to be fully-allocated or full.

It can be noted that, in the example of processor bucket 400, not every slot is allocated at the time that processor bucket 400 is considered to be full. For example, returned slots 406 are not currently allocated even though processor bucket 400 is considered to be full. In this example, it is once every slot in processor bucket 400 has been allocated that processor bucket 400 is considered to be full, regardless of whether one or more of these allocations have subsequently been returned.

When a processor bucket is full, or has been fully-allocated, as in processor bucket 400, then a specific-purpose memory allocator (such as specific-purpose memory allocator 108 of FIG. 1), can switch an active half and a passive half of a virtual address space that it is utilizing.

Figure 5:
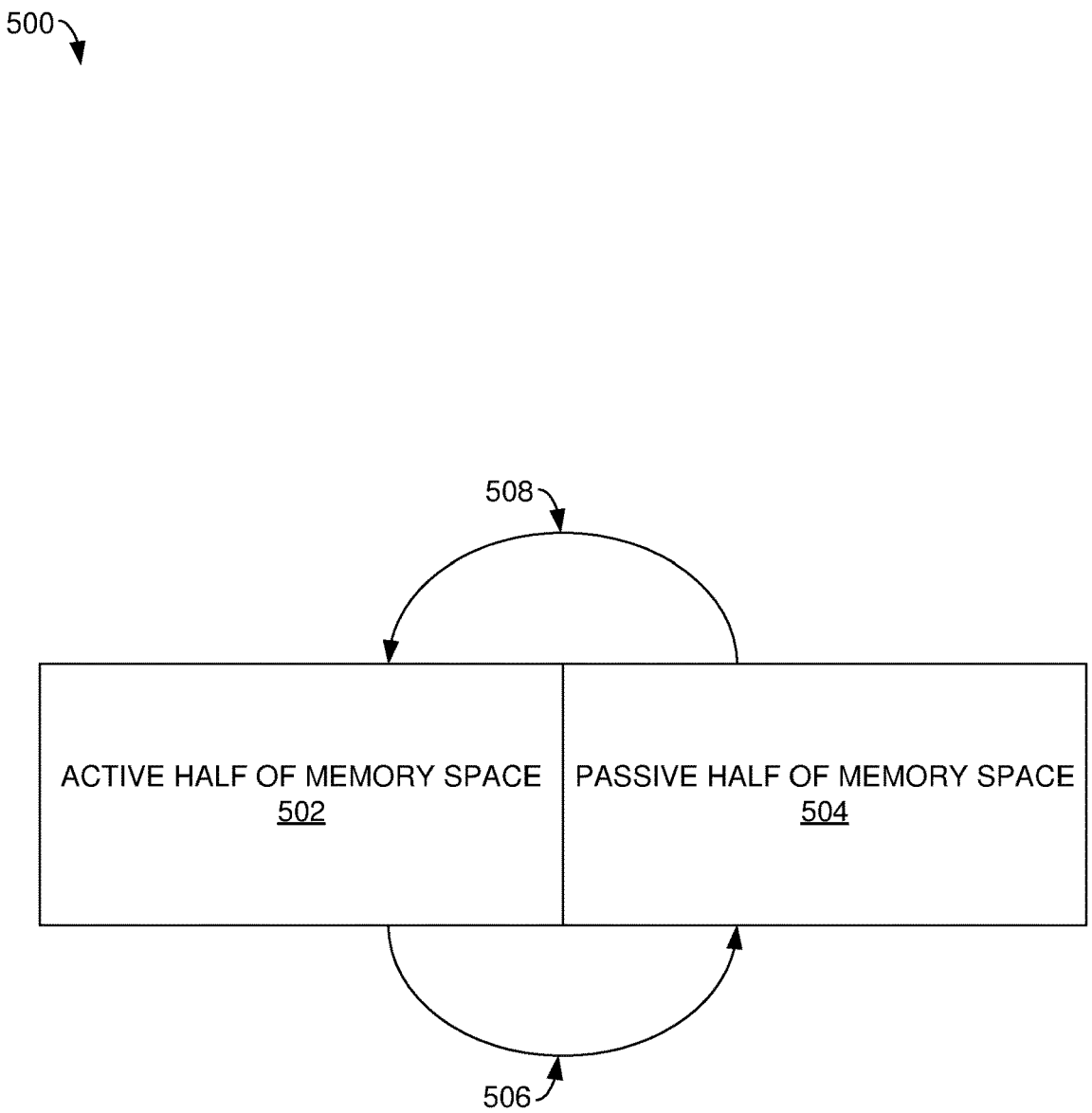
FIG. 5 illustrates a block diagram of switching between halves of a memory address space, in accordance with certain embodiments of this disclosure.

FIG. 5 illustrates a block diagram of switching between halves of a memory address space 500, in accordance with certain embodiments of this disclosure. Memory address space 500 comprises half 502 and half 504. Half 502 can be similar to active half 202 of FIG. 2, and half 504 can be similar to passive half 204 of FIG. 2.

When half 502 is the active half, and a processor bucket in half 502 becomes fully allocated, then the active half can be switched 506 to half 504 (and half 502 becomes the passive half). Similarly, when half 504 is the active half, and a processor bucket in half 504 becomes fully allocated, then the active half can be switched 508 back to half 502 (and half 504 becomes the passive half).

This cycle of switching 506 the active half to half 504, and then switching 508 the active half to half 502 can continue as a bucket in the currently-active half becomes fully allocated.

Figure 6:
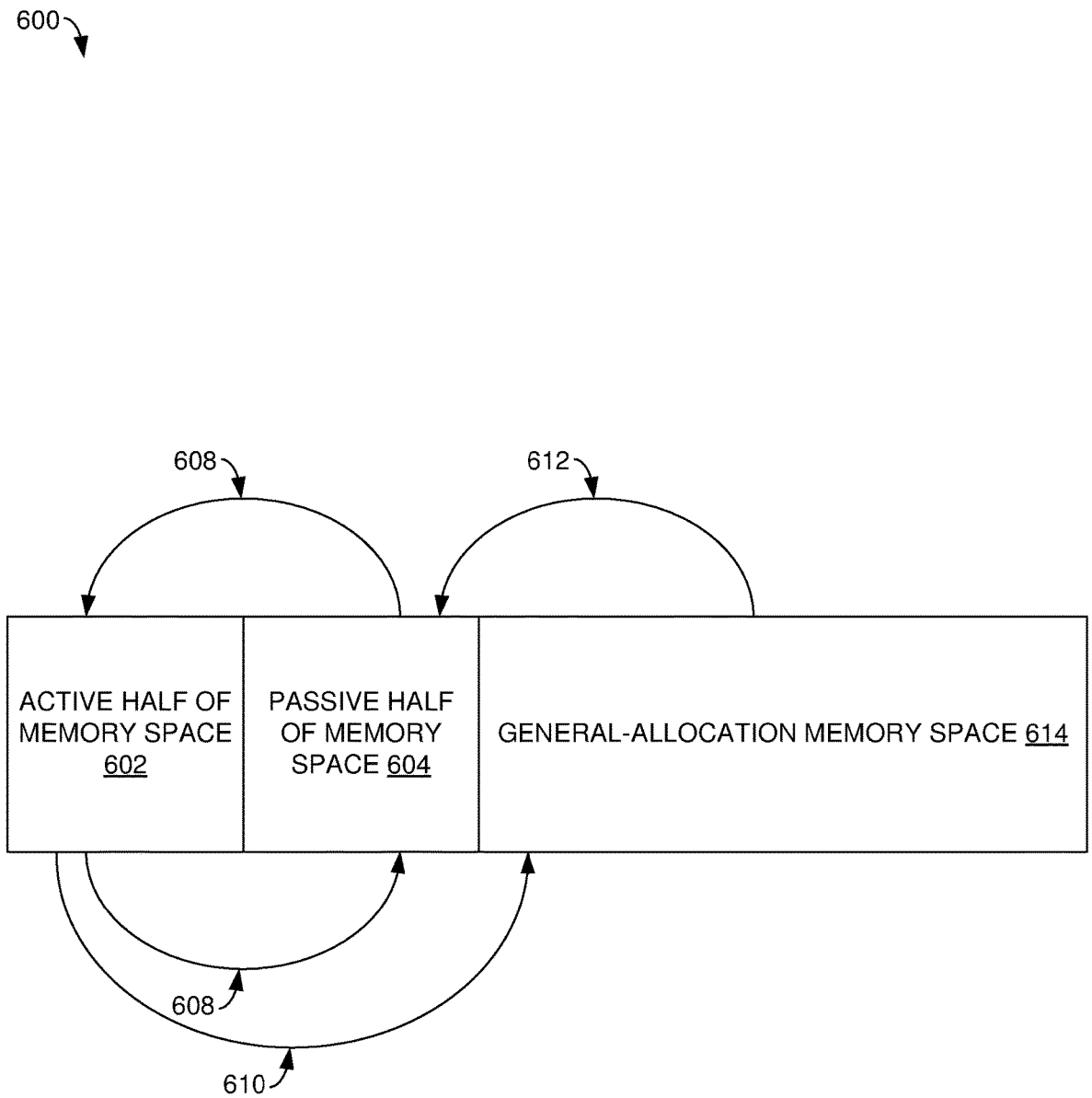
FIG. 6 illustrates a block diagram of a memory address space where memory allocation is switched between a specific-purpose memory allocator and a general-purpose memory allocator, in accordance with certain embodiments of this disclosure.

FIG. 6 illustrates a block diagram of a memory address space 600 where memory allocation is switched between a specific-purpose memory allocator and a general-purpose memory allocator, in accordance with certain embodiments of this disclosure. Memory address space 600 comprises half 602 and half 604 (which can be allocated by a specific-purpose memory allocator, such as specific-purpose memory allocator 108 of FIG. 1), and general purpose address space 614 (which can be allocated by a general-purpose memory allocator, such as general-purpose memory allocator 110 of FIG. 1).

While general purpose address space 614 is depicted as being contiguous with half 604, it can be appreciated that this is one logical depiction, and that there are other ways to implement half 602, half 604, and general purpose address space 614. For instance, in some examples, general purpose address space 614 can be contiguous with half 602 and half 604, and located before half 604 in this contiguous memory space.

Half 602 and half 604 can be similar to half 502 and half 504 of FIG. 5, respectively. Then switch 606 and switch 608 (switching which of half 602 and half 604 is the active half) can be implement in a similar manner as switch 506 and switch 508 of FIG. 5, respectively.

In some examples, a switch will be attempted between which half is the active half, but cannot be effectuated, because the passive half has not had all of its allocations returned yet. In such cases, a fallback can be to switch from allocating by a specific-purpose memory allocator to half 602 and half 604, to allocating by a general-purpose memory allocator to general purpose address space 614. This fallback switch is indicated by switch 610, which occurs where switching the active half from 602 to half 604 cannot be done because half 604 has unreturned allocations.

While allocations are made to general purpose address space 614, half 604 (and/or half 602) can be checked to see whether all allocations have been returned. Where all allocations have been returned, a switch back to half 602 and half 604 can be made. This switch is indicated with switch 612, where half 604 is used as the active half.

It can be appreciated that a fallback to general-purpose memory allocation can be made from either half 602 or half 604, and that a switch back to using half 602 and half 604 can be made with either half 602 or half 604 being the active half after the switch.

Example Process Flows

Figure 7:
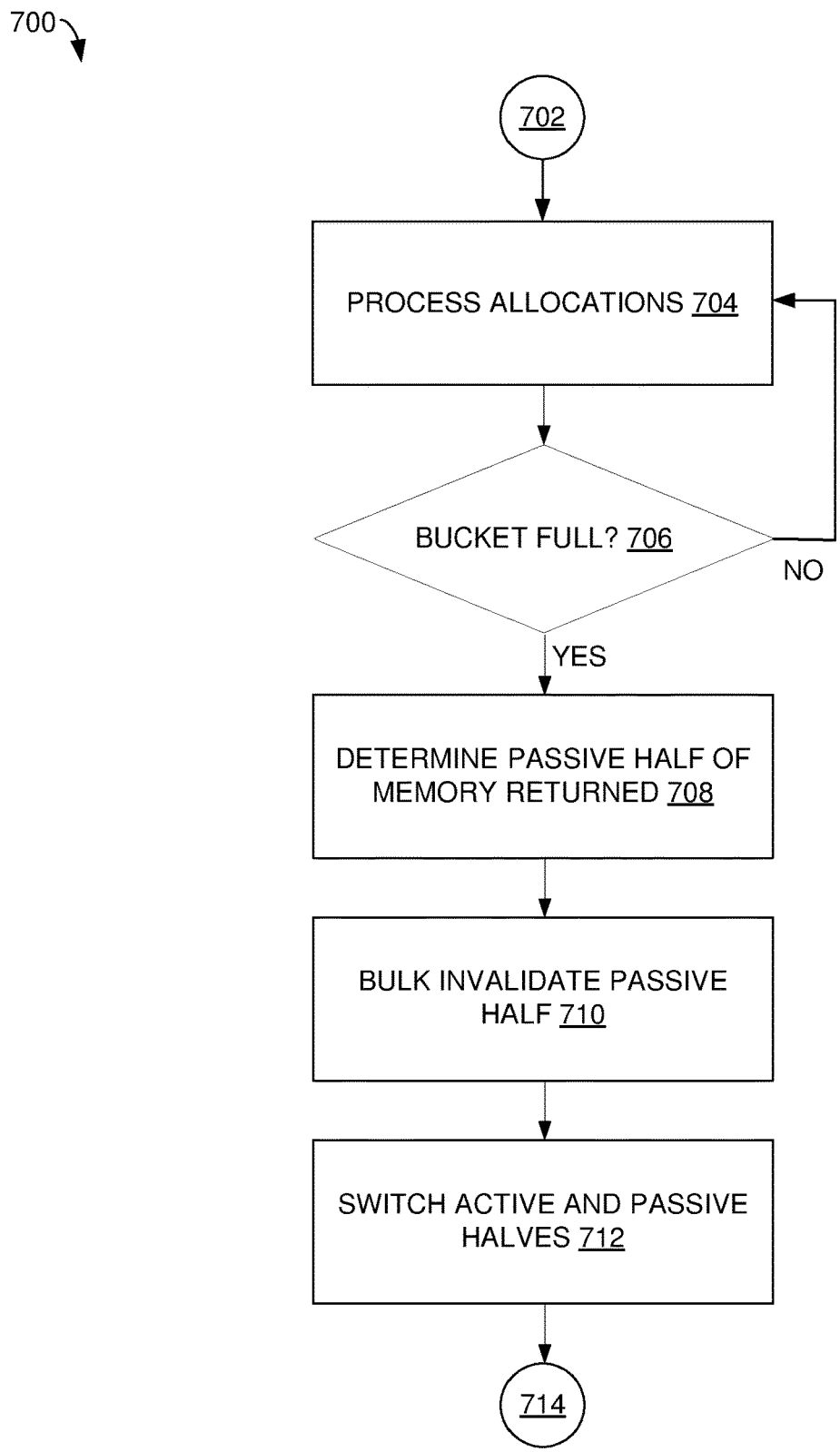
FIG. 7 illustrates an example process flow for computer memory mapping and invalidation, in accordance with certain embodiments of this disclosure.

FIG. 7 illustrates an example process flow 700 for computer memory mapping and invalidation, in accordance with certain embodiments of this disclosure. It can be appreciated that process flow 700 is an example process flow, and that there can be embodiments that implement more or fewer operations than are depicted in process flow 700, or that implement the operations of process flow 700 in a different order than is depicted in process flow 700.

In some embodiments, process flow 700 can be implemented with computer system 102 of FIG. 1 as computer system 102 processes memory allocations and memory returns. More specifically, in some examples, process flow 700 can be implemented with specific-purpose memory allocator 108. Process flow 700 begins with 702, and then moves to operation 704.

Operation 704 is reached from 702, or from operation 706 where it is determined in operation 706 that a bucket for the memory allocation is not full. Operation 704 depicts processing a memory allocation. Processing a memory allocation can comprise receiving a request from a calling thread to allocate memory to that thread, allocating that memory, and sending the calling thread an indication that the memory has been allocated and how to access the memory.

In some examples, operation 704 comprises allocating a contiguous, virtual memory address space comprising a first half and a second half. This contiguous, virtual memory address space can be memory address space 200 of FIG. 2, and the first half and the second half can be active half of memory space 202, and passive half of memory space 204, respectively. In some examples, operation 704 further comprises subdividing the first half into a first portion used by the first processor, and a second portion used by a second processor. This first portion can be processor 1 bucket 306*a* of FIG. 3, and this second portion can be processor 1 bucket 308*b*.

In some examples, operation 704 comprises allocating, by the first processor, space in the first portion. Each processor can have its own bucket within a half, and when memory allocations corresponding to that processor are dealt with, those memory allocations can be made to the processor's bucket in the active half.

In some examples, operation 704 comprises allocating, by a system comprising a first processor, a contiguous virtual memory address space comprising a first half and a second half; subdividing, by the system, the first half into a first portion used by the first processor, and a second portion used by a second processor; and allocating, by the first processor, space in the first portion. In some examples, operation 704 comprises allocating, by a system comprising a first processor, a memory space comprising a first half and a second half; subdividing, by the system, the first half into a first portion used by the first processor, and a second portion used by a second processor; and allocating, by the first processor, space in the first portion.

In some examples, operation 704 comprises subdividing the second half into a third portion used by the first processor, and a fourth portion used by the second processor. That is, each half can be divided into per-processor buckets. For instance, in FIG. 3, half 302 is divided into buckets—processor 1 bucket 306*a* and processor 2 bucket 306*b*—and half 304 is also divided into buckets—processor 1 bucket 306*c* and processor 2 bucket 306*d*.

In some examples, memory allocations in the first portion are exclusively made by the first processor, and memory allocations in the second portion are exclusively made by the second processor. That is, each processor can have a private bucket in each half (e.g., processor 1 bucket 306*a* and processor 1 bucket 306*c* in FIG. 1) that only it can use for memory allocations.

In some examples, a first size of the first portion is equal to a second size of the second portion. That is, each processor's portion, or bucket, can be of the same size. In other examples, buckets can have varying sizes.

In some examples, the first processor makes fixed-sized memory allocations in the first half. That is, each memory allocation can be made for one size—e.g., 128 KB. After operation 704, process flow 700 moves to operation 706.

Operation 706 depicts determining whether a bucket for the memory allocation is full. Determining whether a bucket for the memory allocation is full can comprise determining whether an allocation counter (e.g., allocation counter 308*a* of FIG. 3) are reached a defined threshold (e.g., 1,024 allocations). In some examples, determining whether a bucket is full takes place after each allocation is made. In other examples, determining whether a bucket is full takes place before each allocation is made.

In some examples, operation 706 comprises maintaining a first allocation counter that stores a first value corresponding to a number of memory allocations have been made to the first portion, determining that the first value has reached a defined threshold. Take the example of a 128 MB bucket, 128 KB fixed-size memory allocations, and thus 1,024 available allocations that can be made in a bucket. A counter (e.g., allocation counter 308*a* of FIG. 3) can be used to keep track of the number of allocations, and when that counter reaches a value of 1,024, it can be determined that the first value has reached a defined threshold.

Where in operation 706 it is determined that a bucket for the memory allocation is full, process flow 700 moves to operation 708. Instead, where in operation 706 it is determined that a bucket for the memory allocation is not full, process flow 700 returns to operation 704.

Operation 708 is reached from operation 706 where it is determined in operation 706 that a bucket for the memory allocation is full. Operation 708 depicts determining that memory is a passive half has been returned.

In some examples, operation 708 comprises maintaining a first counter that stores a first value corresponding to a number of memory allocations have been made to the second half; maintaining a second counter that stores a second value corresponding to a number of memory returns to the second half; and determining that the first value equals the second value. In some examples, the first counter can be allocation counter 308*c* of FIG. 3, the second counter can be return counter 310*d*, and a check can be made to see that they store equal values. Where they store equal values, it can be determined that each allocation made has had a corresponding return, so that there is un-returned memory.

In some examples, operation 708 comprises, before the switching the first processor and the second processor to allocating space in the second half, determining, by the system, that an equal number of allocations and memory returns corresponding to the first processor has been made in the second half, and that an equal number of allocations and memory returns corresponding to the second processor has been made in the second half. That is, determining that the passive half's memory has been returned can involve determining that each bucket's memory has been returned. And that can involve determining that the allocation and return counters for each bucket are equal.

In some examples, this operation can be performed for each bucket of the passive half—e.g., both checking allocation counter 308*c* and return counter 310*c* for processor 1 bucket 306*c*, and checking allocation counter 308*d* and return counter 310*d* for processor 1 bucket 306*d*.

In some examples, operation 708 comprises resetting the first value and resetting the second value before the switching the first processor and the second processor to allocating space in the second half. That is, the counters are reset so that they can be used to keep track of the newly-made allocations and returns as the newly-active half is used for allocations. After operation 708, process flow 700 moves to operation 710.

Operation 710 depicts bulk invalidating memory in the passive half. In some examples, operation 710 comprises flushing, by the system, the second half when performing the switching the first processor and the second processor to allocating space in the second half. In some examples, operation 710 comprises flushing, by the system, a translation lookaside buffer (TLB) that corresponds to the second half, or invalidating, by the system, a memory range that corresponds to the second half. After operation 710, process flow 700 moves to operation 712.

Operation 712 depicts switching active and passive halves. This can comprise the processors stopping allocating memory in what was the active half, and starting allocating memory in what is now the active half.

In some examples, switching the first processor and the second processor to allocating space in the second half is performed regardless of whether the second portion has been fully allocated. That is, a switch between halves can be made when any one bucket of the active half has been fully allocated, as opposed to when all buckets of the active half have been fully allocated.

The switch between active passive halves can continue, per these operations of process flow 700. When a bucket of the newly-active second half becomes fully allocated, then the first half can be made the active half again. That is, in some examples, this can comprise, after the switching the first processor and the second processor to allocating space in the second half, and in response to determining, by the system, that a third portion of the second half has been fully allocated, switching the first processor and the second processor to allocating space in the first half.

In some examples, operation 712 comprises implementing, by the system, a global lock when switching from allocating space in the first half to allocating space in the second half.

In some examples, a combination of operations 706, 708, and 712 can comprise, in response to determining that the first portion has been fully allocated, and in response to determining that memory allocated in the second half has been returned, switching the first processor and the second processor to allocating space in the second half.

In some examples, the combination of operations 706 and 712 can comprise, in response to determining, by the system, that the first portion has been fully allocated, switching the first processor and the second processor to allocating space in the second half. After operation 712, process flow 700 moves to 714, where process flow 700 ends.

Figure 8:
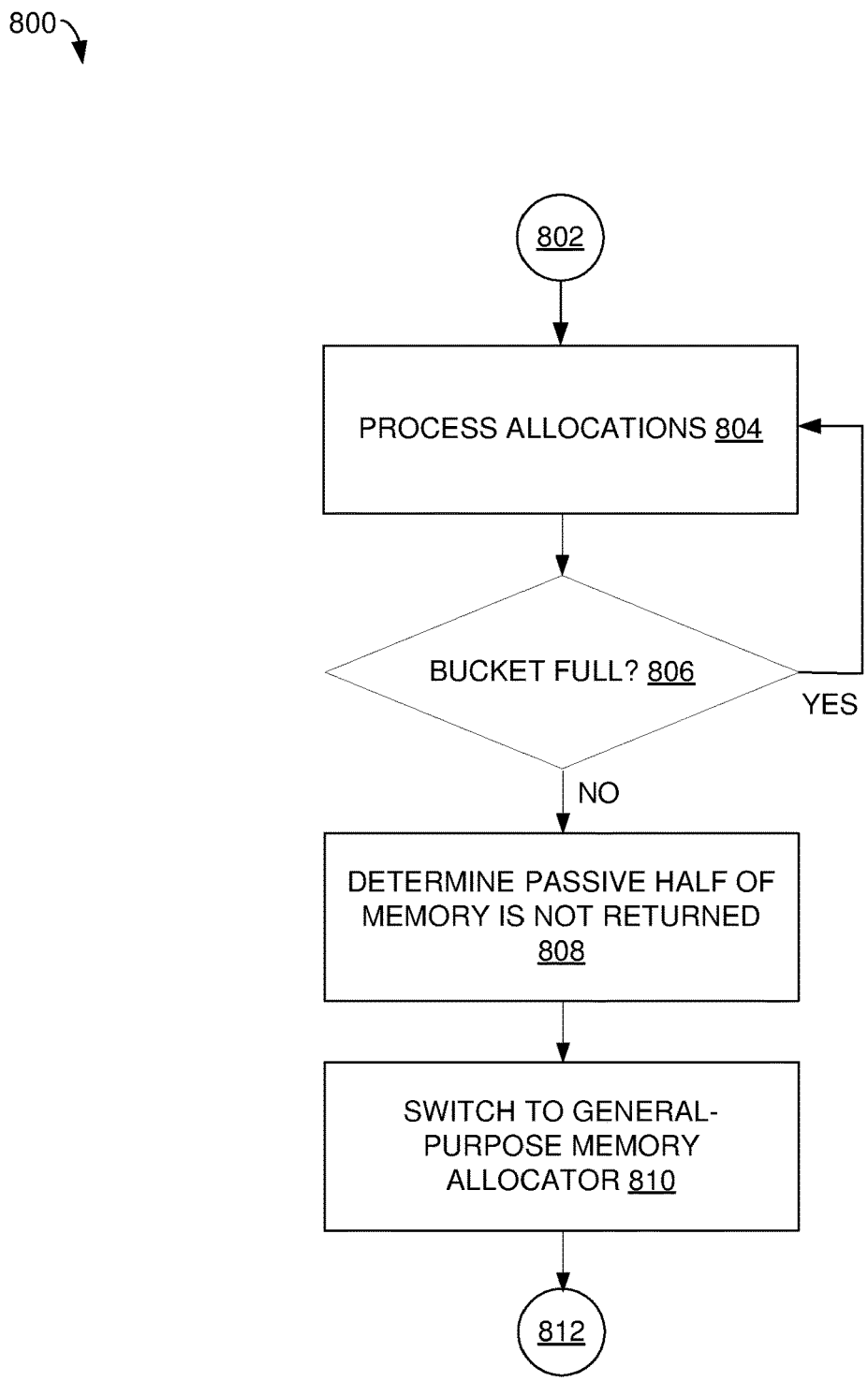
FIG. 8 illustrates an example process flow for switching from a specific-purpose memory allocator to a general-purpose memory allocator, in accordance with certain embodiments of this disclosure.

FIG. 8 illustrates an example process flow 800 for switching from a specific-purpose memory allocator to a general-purpose memory allocator, in accordance with certain embodiments of this disclosure. It can be appreciated that process flow 800 is an example process flow, and that there can be embodiments that implement more or fewer operations than are depicted in process flow 800, or that implement the operations of process flow 800 in a different order than is depicted in process flow 800.

In some embodiments, process flow 800 can be implemented with computer system 102 of FIG. 1 as computer system 102 processes memory allocations and memory returns. More specifically, in some examples, aspects of process flow 800 can be implemented with specific-purpose memory allocator 108. Process flow 800 begins with 802, and then moves to operation 804.

Operation 804 is reached from 802, or from operation 806 where it is determined in operation 806 that a bucket for the memory allocation is full. Operation 804 depicts processing a memory allocation. In some examples, operation 804 can be implemented in a similar manner as operation 704 of FIG. 7. After operation 804, process flow 800 moves to operation 806.

Operation 806 depicts determining whether a bucket for the memory allocation is full. In some examples, operation 806 can be implemented in a similar manner as operation 706 of FIG. 7. Where in operation 806 it is determined that a bucket for the memory allocation is not full, process flow 800 returns to operation 804. Instead, where in operation 806 it is determined that a bucket for the memory allocation is full, process flow 800 moves to operation 808.

Operation 808 is reached from operation 806 where it is determined in operation 806 that a bucket for the memory allocation is full. Operation 808 depicts determining that memory is a passive half has not yet been returned. This can involve determining that an allocation counter and a return counter for a bucket in the passive half are not equal, for each bucket in the passive half.

In some examples, operation 808 comprises in response to determining, by the system, that an allocation to the second half will not be made, switching to allocating space in a general-purpose memory address space. It can be that an allocation to the second half will not be made, because the second half will not be switched to the active half, because not all memory in the second half has been returned yet. After operation 808, process flow 800 moves to operation 810.

Operation 810 depicts switching to using a general-purpose memory allocator. This can comprise switching from making memory allocations with a specific-purpose memory allocator (such as specific-purpose memory allocator 108 of FIG. 1) to making new memory allocations using a general-purpose memory allocator (such as general-purpose memory allocator 110 of FIG. 1). After operation 810, process flow 800 moves to 812, where process flow 800 ends.

Figure 9:
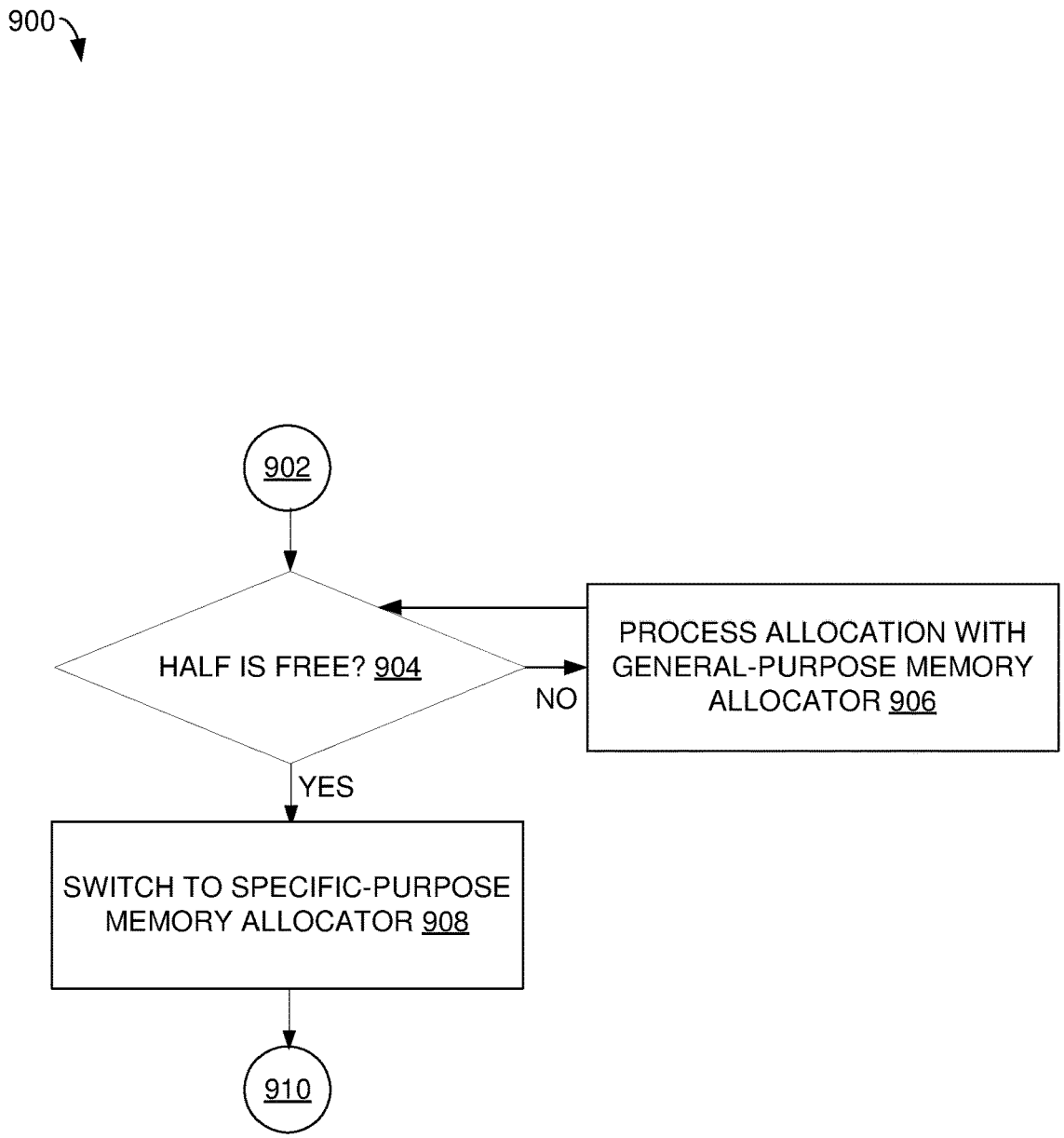
FIG. 9 illustrates an example process flow for switching from a general-purpose memory allocator to a specific-purpose memory allocator, in accordance with certain embodiments of this disclosure.

FIG. 9 illustrates an example process flow 900 for switching from a general-purpose memory allocator to a specific-purpose memory allocator, in accordance with certain embodiments of this disclosure.

It can be appreciated that process flow 900 is an example process flow, and that there can be embodiments that implement more or fewer operations than are depicted in process flow 900, or that implement the operations of process flow 900 in a different order than is depicted in process flow 900.

In some embodiments, process flow 900 can be implemented with computer system 102 of FIG. 1 as computer system 102 processes memory allocations and memory returns. More specifically, in some examples, process flow 900 can be implemented with specific-purpose memory allocator 108 and general-purpose memory allocator 110. Process flow 900 begins with 902, and then moves to operation 904.

Operation 904 is reached from 902, or from operation 906. Operation 904 depicts determining whether a half has become free. In some examples, operation 904 can be implemented in a similar manner as operation 808 of FIG. 8, can be determined for one half (e.g., the half that was last the passive half), or for both halves.

Where in operation 904 it is determined that a half has not become free, then process flow 900 moves to operation 906. Instead, where in operation 904 it is determined that a half has become free, then process flow 900 moves to operation 908.

Operation 906 is reached from operation 904 where in operation 904 it is determined that a half has not become free. Operation 906 depicts processing memory allocations with a general-purpose memory allocator. This can comprise general-purpose memory allocator 110 of FIG. 1 processing memory allocation requests from threads 106 by allocating memory in a general-purpose memory space, such as general-allocation memory space 614 of FIG. 6.

In some examples, operations 904 and 906 can be implemented by different threads, so that they may be performed in parallel. In other examples, operation 906 can execute for a given period of time (or number of memory allocations) before returning to operation 904 to determine whether a half has become free. After operation 906, process flow 900 returns to operation 904.

Operation 908 is reached from operation 904 where in operation 904 it is determined that a half has not become free. Operation 908 depicts switching to using a specific-purpose memory allocator. Operation 908 can comprise switching from making memory allocations with general-purpose memory allocator 110 of FIG. 1 to making memory allocations with specific-purpose memory allocator 108.

In some examples, the combination of operations 904 and 908 comprises, after the switching to allocating space in the general-purpose memory address space, and in response to determining that allocations to the first half or the second half have been returned, switching the first processor and the second processor to allocating space in the first half or the second half. That is, periodic checks can be made to determine whether all allocations in the first half and/or the second half have been returned. When that is determined to be true, memory allocation can switch back to being done with the specific-purpose memory allocator, with a fully-returned half being used as the active half.

After operation 908, process flow 900 moves to 910, where process flow 900 ends.

Figure 10:
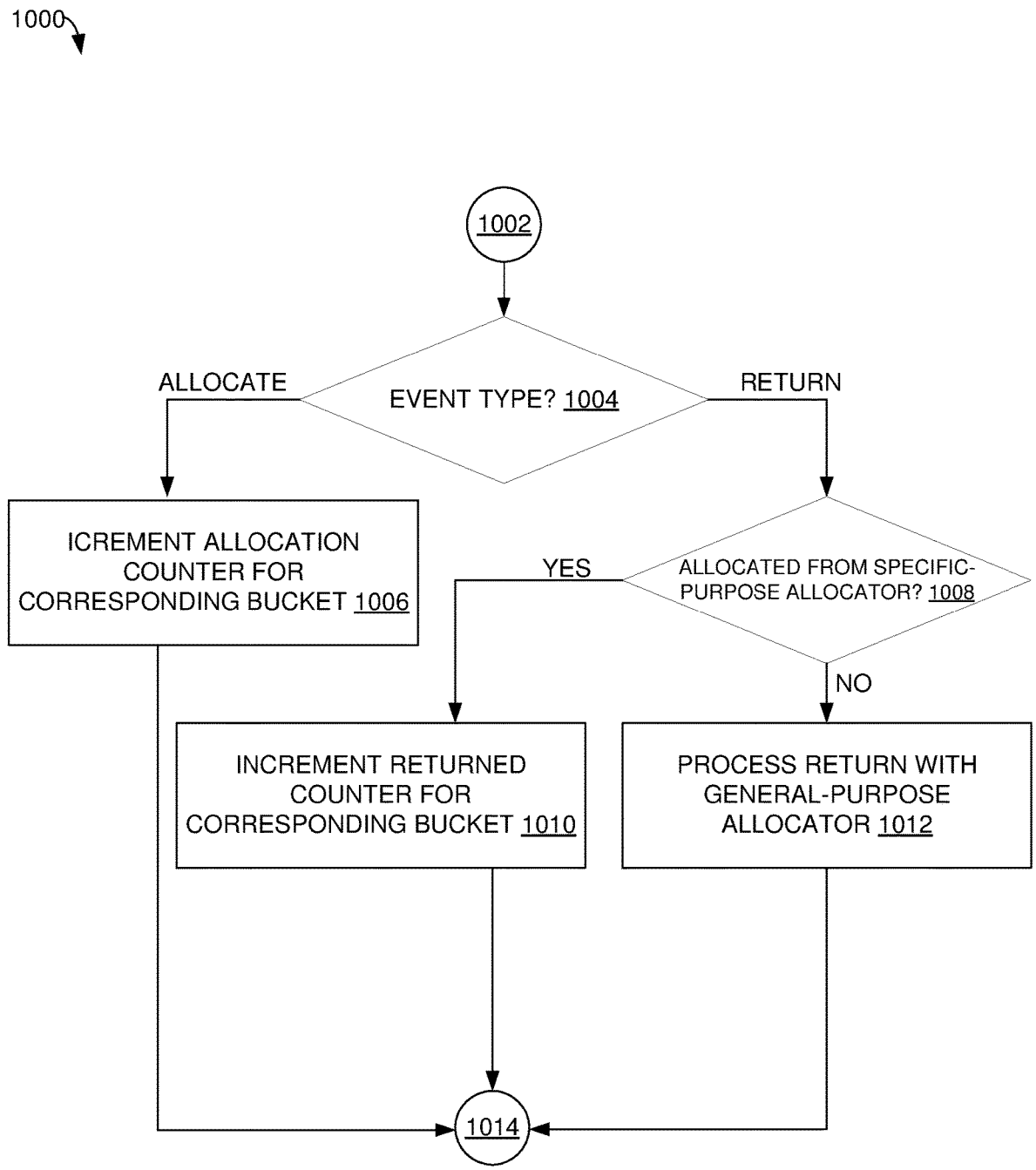
FIG. 10 illustrates an example process flow for maintaining allocation and return counters, in accordance with certain embodiments of this disclosure.

FIG. 10 illustrates an example process flow for maintaining allocation and return counters, in accordance with certain embodiments of this disclosure. It can be appreciated that process flow 1000 is an example process flow, and that there can be embodiments that implement more or fewer operations than are depicted in process flow 1000, or that implement the operations of process flow 1000 in a different order than is depicted in process flow 1000.

In some embodiments, process flow 1000 can be implemented with computer system 102 of FIG. 1 as computer system 102 processes memory allocations and memory returns. More specifically, in some examples, process flow 1000 can be implemented with specific-purpose memory allocator 108. Process flow 1000 begins with 1002, and then moves to operation 1004.

Operation 1004 depicts determining a type of event received. In some examples, events can be memory allocations and memory returns received from a thread of threads 106 of FIG. 1. A type of event can be a memory allocation when a memory allocation call is made by a thread, and a type of event can be a memory return when previously-allocated memory is returned by the calling thread.

Where in operation 1004 it is determined that a type of event received is a memory allocation, then process flow 1000 moves to operation 1006. Instead, where in operation 1004 it is determined that a type of event received is a memory return, then process flow 1000 moves to operation 1008.

Operation 1006 is reached from operation 1004 where it is determined in operation 1004 that a type of event received is a memory allocation. Operation 1006 depicts incrementing an allocation counter for a bucket corresponding to the memory allocation. This allocation counter can be allocation counter 308a of FIG. 3. In some examples, operation 1006 comprises incrementing a first counter when one memory allocation is made in the first portion. After operation 1006, process flow 1000 moves to 1010, where process flow 1000 ends.

Operation 1008 is reached from operation 1004 where it is determined in operation 1004 that a type of event received is a memory return. Operation depicts determining whether the memory being returned was allocated from a specific-purpose memory allocator. Using the example of FIG. 6, it can be determined that the memory being returned was allocated from a specific-purpose memory allocator where a virtual address of the memory being returned is within active half of memory space 602 or passive half of memory space 604. Similarly, it can be determined that the memory being returned was allocated from a general-purpose memory allocator where a virtual address of the memory being returned is within general-allocation memory space 614.

Where in operation 1008 it is determined that the memory being returned was allocated from a specific-purpose memory allocator, then process flow 1000 moves to operation 1010. Instead, where in operation 1004 it is determined that the memory being returned was not allocated from a specific-purpose memory allocator, then process flow 1000 moves to operation 1012.

Operation 1010 is reached from operation 1008 where it is determined in operation 1008 that the memory being returned was allocated from a specific-purpose memory allocator. Operation 1010 depicts incrementing a return counter for a bucket corresponding to the memory return. This return counter can be return counter 310a of FIG. 3. In some examples, operation 1008 comprises incrementing a second counter when one memory return is made in the first portion. After operation 1008, process flow 1000 moves to 1014, where process flow 1000 ends.

Operation 1012 is reached from operation 1008 where it is determined in operation 1008 that the memory being returned was not allocated from a specific-purpose memory allocator. Operation 1012 depicts processing the memory return with a general-purpose memory allocator. This general-purpose memory allocator can be general-purpose memory allocator 110 of FIG. 1. After operation 1008, process flow 1000 moves to 1014, where process flow 1000 ends.

Example Operating Environments

Figure 11:
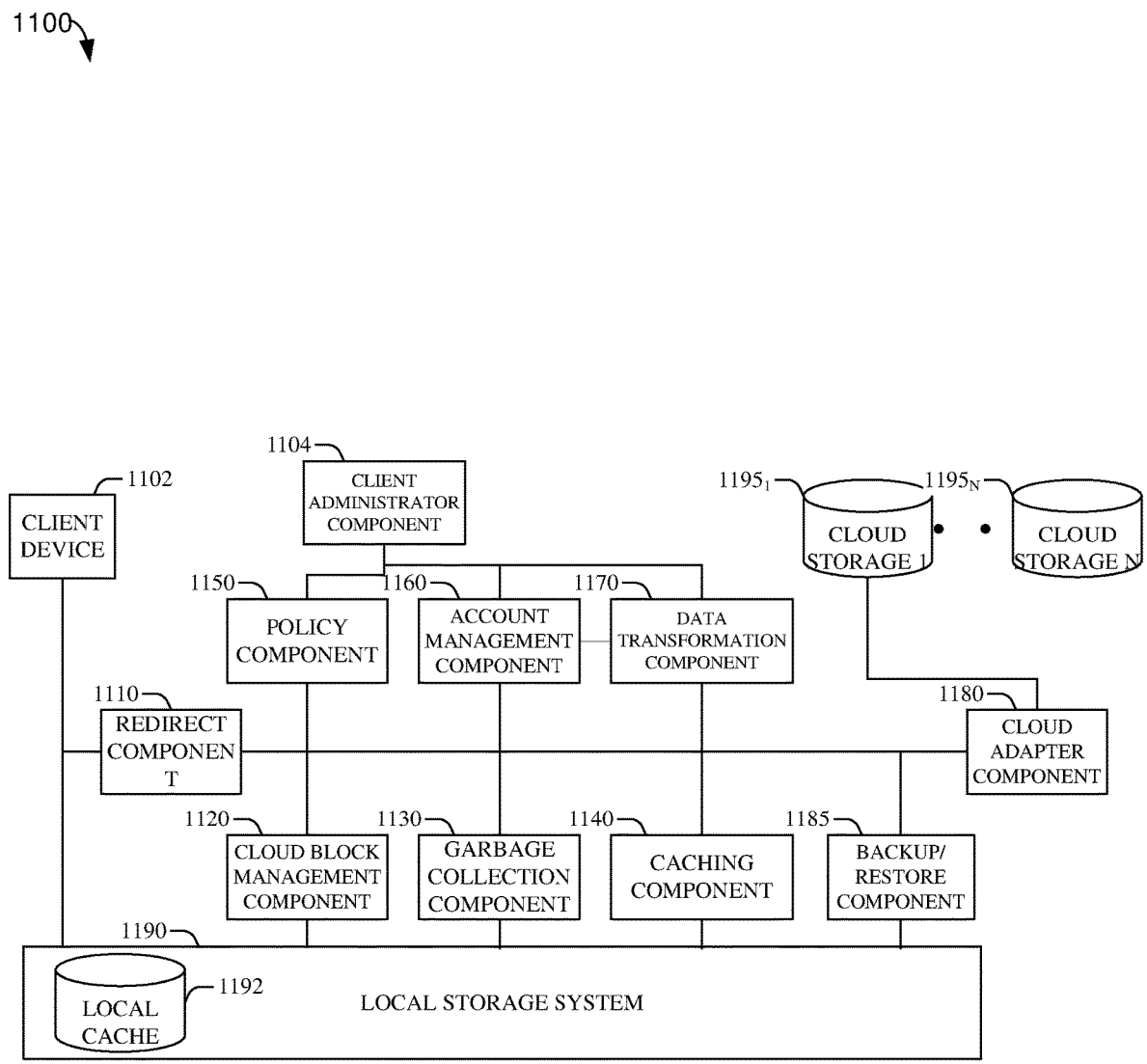
FIG. 11 illustrates a block diagram of an example distributed file storage system that employs tiered cloud storage in accordance with certain embodiments of this disclosure.
Figure 12:
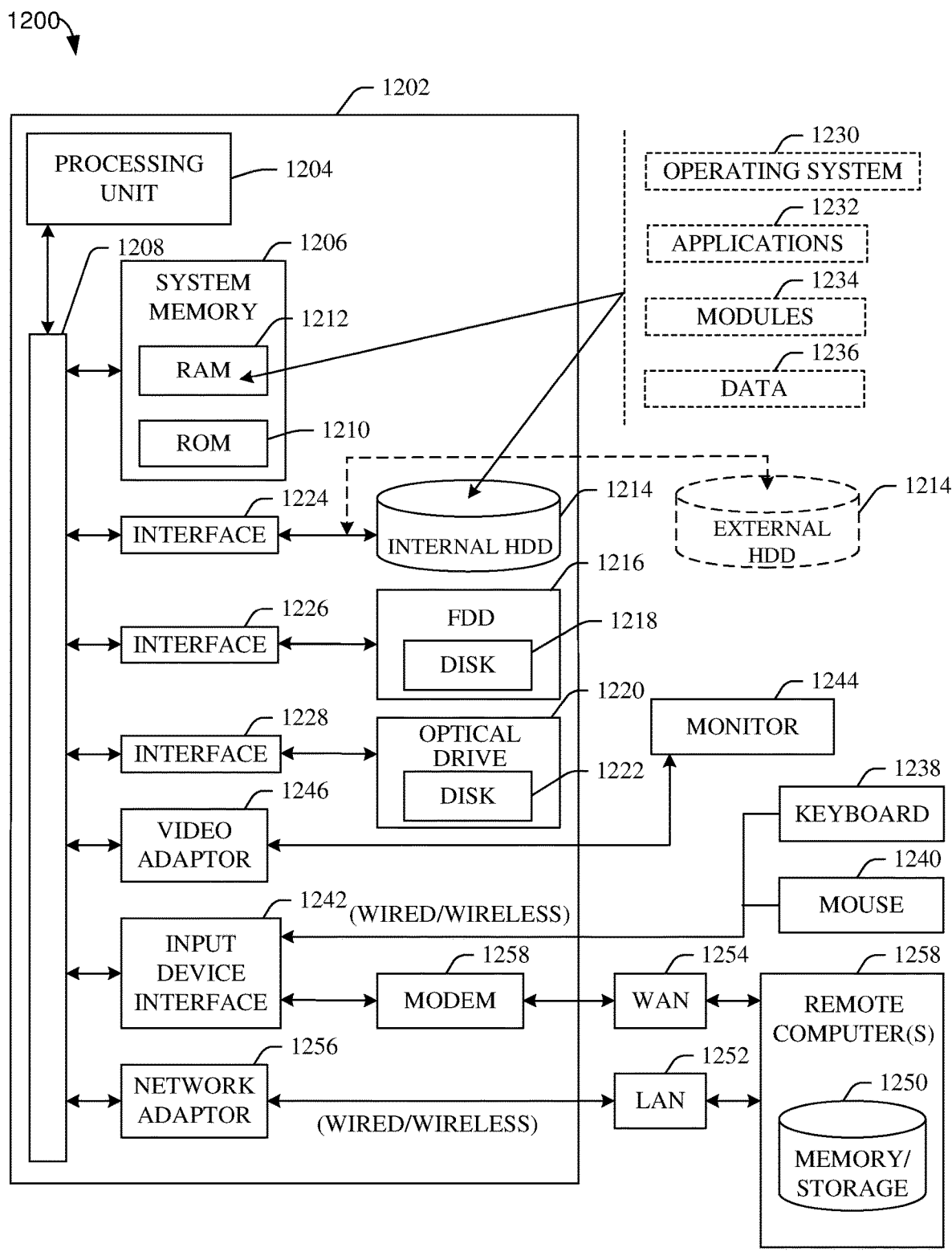
FIG. 12 illustrates an example block diagram of a computer operable to execute certain embodiments of this disclosure.

To provide further context for various aspects of the subject specification, FIGS. 11 and 12 illustrate, respectively, a block diagram of an example distributed file storage system 1100 that employs tiered cloud storage and block diagram of a computer 1202 operable to execute the disclosed storage architecture in accordance with aspects described herein. For example, aspects of distributed storage system 1100 and computer 1202 can be used to implement computer system 102 of FIG. 1. In some examples, distributed storage system can implement aspects of the operating procedures of FIGS. 7-10 to provide for computer memory mapping and invalidation techniques as described herein on a distributed storage system.

Referring now to FIG. 11, there is illustrated an example local storage system including cloud tiering components and a cloud storage location in accordance with implementations of this disclosure. Client device 1102 can access local storage system 1190. Local storage system 1190 can be a node and cluster storage system such as an EMC Isilon Cluster that operates under OneFS operating system. Local storage system 1190 can also store the local cache 1192 for access by other components. It can be appreciated that the systems and methods described herein can run in tandem with other local storage systems as well.

As more fully described below with respect to redirect component 1110, redirect component 1110 can intercept operations directed to stub files. Cloud block management component 1120, garbage collection component 1130, and caching component 1140 may also be in communication with local storage system 1190 directly as depicted in FIG. 11 or through redirect component 1110. A client administrator component 1104 can use an interface to access the policy component 1150 and the account management component 1160 for operations as more fully described below with respect to these components. Data transformation component 1170 can operate to provide encryption and compression to files tiered to cloud storage. Cloud adapter component 1180 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 1197 can be utilized to back up the files stored within the local storage system 1190.

Cloud block management component 1120 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, can be still stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1120 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1160 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1120 based on list of mappings it manages. For example, each stub can be associated with an account, and the cloud block management component 1120 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 1180 manages the sending and receiving of data to and from the cloud service providers. The cloud adapter component 1180 can utilize a set of APIs. For example, each cloud service provider may have provider specific API to interact with the provider.

A policy component 1150 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1130. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1130 can be used to determine which files/objects/data constructs remaining in both local storage and cloud storage can be deleted. In one implementation, the resources to be managed for garbage collection include cloud metadata objects (CMOs), cloud data objects (CDOs) (e.g., a cloud object containing the actual tiered content data), local cache data, and cache state information.

A caching component 1140 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1120, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1140 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data can be represented by clear, adding existing file information to the cache can be represented by fill, adding new information to the cache by write, reading information from the cache can be represented by read following a fill, updating existing file information to the cache can be represented by fill followed by a write, and truncating cache due to file operation can be represented by sync and then a partial clear.

In one implementation, the caching component 1140 can track any operations performed on the cache. For example, any operation touching the cache can be added to a queue prior to the corresponding operation being performed on the cache. For example, before a fill operation, an entry can be placed on an invalidate queue as the file and/or regions of the file will be transitioning from an uncached state to cached state. In another example, before a write operation, an entry can be placed on a synchronization list as the file and/or regions of the file will be transitioning from cached to cached-dirty. A flag can be associated with the file and/or regions of the file to show that it has been placed in a queue, and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be requeued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream (ADS). It can be appreciated that ADS can be based on the New Technology File System (NTFS) ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; and (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached," the region can be filled; (7) the cache tracking tree can updated to mark the cache region as dirty; (8) the data can be written to the cache region; and (9) the lock can be deactivated.

In one implementation, data can be cached at the time of a first read. For example, if the state associated with the data range called for in a read operation is non-cached, then this can be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1170 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1197 can transfer a copy of the files within the local storage system 1190 to another cluster (e.g., target cluster). Further, the backup/restore component 1197 can manage synchronization between the local storage system 1190 and the other cluster, such that, the other cluster is timely updated with new and/or modified content within the local storage system 1190.

FIG. 12 illustrates a block diagram of a computer 1202 operable to execute the disclosed communication architecture. To provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read-only memory (ROM), electrically erasable programmable read-only memory (EEPROM), flash memory or other memory technology, compact disc read only memory (CD-ROM), digital versatile disc (DVD; sometimes referred to as digital video disc) or other optical disc storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals can refer to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 12, the example environment 1200 for implementing various aspects of the specification includes a computer 1202, the computer 1202 including a processing unit 1204, a system memory 1206 and a system bus 1208. As an example, the component(s), server(s), node(s), cluster(s), system(s), and/or device(s) disclosed herein can each include at least a portion of the computer 1202. The system bus 1208 can couple system components including, but not limited to, the system memory 1206 to the processing unit 1204. The processing unit 1204 can be any of various commercially-available or custom processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 can include ROM 1210 and RAM 1212. A basic input/output system (BIOS) can be stored in a non-volatile memory 1210 such as ROM, erasable programmable read-only memory (EPROM), EEPROM, where the BIOS can contain the basic routines that help to transfer information between elements within the computer 1202, such as during startup. The RAM 1212 can also include a high-speed RAM such as static RAM for caching data, or NVRAM.

The computer 1202 further includes an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disc drive 1220, (e.g., reading a CD-ROM disc 1222 or, to read from or write to other high capacity optical media such as the DVD). The hard disk drive 1214, magnetic disk drive 1216 and optical disc drive 1220 can be connected to the system bus 1208 by a hard disk drive interface 1224, a magnetic disk drive interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the subject disclosure.

The drives and their associated computer-readable storage media can provide nonvolatile storage of data, data structures, computer-executable instructions, and so forth. For the computer 1202, the drives and storage media can accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired or wireless input devices, e.g., a keyboard 1238 and/or a pointing device, such as a mouse 1240 or a touch screen or touchpad (not illustrated). These and other input devices can be connected to the processing unit 1204 through an input device interface 1242 that is coupled to the system bus 1208, but can be connected by other interfaces, such as a parallel port, an IEEE 1394 port, a game port, a USB port, an infrared (IR) interface, etc. A monitor 1244 or other type of display device can also be connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and can include many or all the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments can be commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, can be connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., desktop and/or portable computer, server, communications satellite, etc. This includes at least Wireless Fidelity (Wi-Fi) and BLUETOOTH wireless technologies. Thus, the communication can be a predefined structure as with a conventional network or simply an ad hoc communication between at least two devices.

Wi-Fi can allow a connection to the Internet from a couch at home, a bed in a hotel room, or a conference room at work, without wires. Wi-Fi can be a wireless technology similar to that used in a cell phone that enables such devices, e.g., computers, to send and receive data indoors and out; anywhere within the range of a base station. Wi-Fi networks can use radio technologies called IEEE 802.11 (a, b, g, n, etc.) to provide secure, reliable, fast wireless connectivity. A Wi-Fi network can be used to connect computers to each other, to the Internet, and to wired networks (which can use an IEEE 802.3 standard or Ethernet). Wi-Fi networks can operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a first processor; and
   a memory that stores executable instructions that, when executed by the first processor, facilitate performance of operations, comprising:
      allocating a contiguous, virtual memory address space comprising a first half and a second half;
      subdividing the first half into a first portion used by the first processor, and a second portion used by a second processor;
      allocating, by the first processor, first space in the first portion; and
      in response to determining that the first portion has been fully allocated, and in response to determining that a second memory allocated in the second half has been returned, switching the first processor and the second processor to allocating second space in the second half.

2. The system of claim 1, wherein the determining that the first portion has been fully allocated comprises:
   maintaining a first allocation counter that stores a first value corresponding to a first number of memory allocations have been made to the first portion; and
   determining that the first value has reached a first defined threshold.

3. The system of claim 1, wherein the determining that the second memory allocated in the second half has been returned comprises:
   maintaining a first counter that stores a first value corresponding to a second number of memory allocations have been made to the second half;
   maintaining a second counter that stores a second value corresponding to a third number of memory returns to the second half; and
   determining that the first value equals the second value.

4. The system of claim 3, wherein the operations further comprise:
   resetting the first value and resetting the second value before the switching the first processor and the second processor to allocating the second space in the second half.

5. The system of claim 1, wherein memory allocations in the first portion are exclusively made by the first processor, and wherein memory allocations in the second portion are exclusively made by the second processor.

6. The system of claim 1, wherein the operations further comprise:
   subdividing the second half into a third portion used by the first processor, and a fourth portion used by the second processor.

7. The system of claim 1, wherein the switching the first processor and the second processor to allocating the second space in the second half is performed regardless of whether the second portion has been fully allocated.

8. A method, comprising:
   allocating, by system comprising a first processor, a contiguous virtual memory address space comprising a first half and a second half;
   subdividing, by the system, the first half into a first portion used by the first processor, and a second portion used by a second processor;
   allocating, by the first processor, first space in the first portion; and in response to determining, by the system, that the first portion has been fully allocated, switching the first processor and the second processor to allocating second space in the second half.

9. The method of claim 8, further comprising:
in response to determining, by the system, that an allocation to the second half will not be made, switching to allocating space in a general-purpose memory address space.

10. The method of claim 9, further comprising:
after the switching to allocating space in the general-purpose memory address space, and in response to determining that allocations to the first half or the second half have been returned, switching, by the system, the first processor and the second processor to allocating the first space in the first half or the second space in the second half.

11. The method of claim 8, wherein a first size of the first portion is equal to a second size of the second portion.

12. The method of claim 8, further comprising:
before the switching the first processor and the second processor to allocating the second space in the second half, determining, by the system, that a first equal number of allocations and memory returns corresponding to the first processor has been made in the second half, and that a second equal number of allocations and memory returns corresponding to the second processor has been made in the second half.

13. The method of claim 8, further comprising:
after the switching the first processor and the second processor to allocating space in the second half, and in response to determining, by the system, that a third portion of the second half has been fully allocated, switching the first processor and the second processor to allocating the first space in the first half.

14. The method of claim 8, further comprising:
implementing, by the system, a global lock when switching from the allocating of the first space in the first half to the allocating of the second space in the second half.

15. A non-transitory computer-readable medium comprising instructions that, in response to execution, cause a system comprising a first processor to perform operations, comprising:
allocating, by the system, a memory space comprising a first half and a second half;
subdividing, by the system, the first half into a first portion used by the first processor, and a second portion used by a second processor;
allocating, by the first processor, a first address space in the first portion; and
in response to determining, by the system, that the first portion has been fully allocated, switching the first processor and the second processor to allocating a second address space in the second half.

16. The non-transitory computer-readable medium of claim 15, further comprising:
flushing, by the system, the second half when performing the switching the of the first processor and the second processor to allocating the second address space in the second half.

17. The non-transitory computer-readable medium of claim 16, wherein the flushing the second half comprises:
flushing, by the system, a translation lookaside buffer that corresponds to the second half, or invalidating, by the system, a memory range that corresponds to the second half.

18. The non-transitory computer-readable medium of claim 15, wherein the first processor allocates according to fixed-sized memory allocations in the first half.

19. The non-transitory computer-readable medium of claim 15, wherein a first counter is incremented when one memory unit is allocated in the first portion.

20. The non-transitory computer-readable medium of claim 15, wherein a second counter is incremented when one memory return is made in the first portion.

* * * * *